3,153,030
FINING OF GELATIN SOLUTIONS WITH PHOSPHATES
George A. Consolazio, Burlington, and Ronald E. Moses, East Boston, Mass., assignors to General Foods Corporation, White Plains, N.Y., a corporation of Delaware
No Drawing. Filed Jan. 11, 1961, Ser. No. 110,256
5 Claims. (Cl. 260—118)

This invention relates to the treating of gelatin. More specifically, it relates to a method of fining gelatin to remove impurities therefrom and to improve the clarity and other properties thereof.

As is well known, many proteins, typified by gelatin, are recovered from raw materials which contain a high percentage of impurities. Gelatin, for example, may be recovered from several sources, typical of which are ossein, pigskins, and lime splits. During the processing operations which are required to recover gelatin from these or other sources, the raw material may be contacted with a variety of reagents among which, depending upon the particular raw material and process, are lime, magnesium oxide, caustic soda, and various other materials. Furthermore, during the various handling or treating operations, gelatin solutions may come into contact with various materials, including metal surfaces of equipment, etc., from which the solution may pick up varying amounts of impurities.

As a result, extracted gelatin will generally contain varying amounts of a wide variety of impurities, most typical of which are metallic impurities, e.g., heavy metals. The metals which have geen found in gelatin at various times include calcium, barium, strontium, magnesium, beryllium, radium, lithium, iron, silver, lead, tin, chromium, mercury, copper, zinc, cadmium, titanium, uranium, gold, platinum and bismuth. The concentration in which these metals is found ranges from the lower limit of measurability for, e.g., radium, uranium and gold, to quantities in the low percentage range, e.g., 2% to 4% for calcium, under certain undesirable conditions. It is possible to control the amount of some of these metals in the final gelatin product by modifying or controlling the processing steps; in some instances, the quantity of impurities may be decreased to some extent by washing or other treatment of either the raw material stock or the final dry gelatin product.

It will be apparent to those skilled in the art that each of these impurities, typified by heavy metals, may be considered undesirable for various reasons and at various levels. In all cases, presence of these materials increases the ash content. Since ash content is generally regarded as being one of the criteria for determining quality of gelatin, it will be apparent that if the total content of these metals (in the form of their ash which may typically be measured as the oxide) is greater than about 2.0%, the gelatin may be considered undesirable for certain uses, e.g. gelatin desserts.

Presence in gelatin of some of these impurities, typified by calcium, imparts to the product gelatin a very low clarity, i.e., a high degree of turbidity. This may be undesirable when the gelatin is used in numerous ways including, for example, gelatin desserts or in photographic emulsions.

Certain of these metal impurities, e.g., copper, may be toxic, and for this reason it may be necessary to minimize the concentration of this metal. Still others of the metals, typified by magnesium, may react with components found in water to form precipitates which may interfere with the various reactions in which the gelatin may be participating or which occur in the presence of the gelatin.

Furthermore, certain of these impurities, typified by mercury or copper, are sufficiently active photographically to interfere with the properties of photographic emulsions which are prepared from gelatin. More specifically, presence of such materials may be sufficient to render the gelatin photographically active rather than inert as is desired in certain photographic uses.

Attempts which have heretofore been made to purify gelatin with respect to these impurities have been less than fully successful. Prior art techniques have been undesirably characterized by requiring undesirable chemical reactions to occur in the presence of the gelatin solution; these reactions and/or treatments have typically been very slow in effecting the desired results. Furthermore, in many of the attempts it has been necessary to employ undesirably high temperatures for long periods of time. When washing has been employed at ambient temperatures, it has been found that the required period of time for the substantial removal of impurities is inordinately long.

Under certain other conditions attempts have been made to purify the gelatin at very low or at very high $pH$. Such attempts, as well as other approaches which have required unusual conditions, including high temperature, lengthy treatment time, and the use of special reagents, have been uniformly unsatisfactory in that they undesirably modify the physical properties of the gelatin. Treatment under the best prior art conditions will commonly lower the Bloom and/or the viscosity of gelatin, and most commonly these treatments are such that there is a considerable loss of otherwise recoverable protein.

It is an object of this invention to set forth a novel technique for treating gelatin to remove substantial quantities of impurities therefrom. It is a more specific object of this invention to achieve production of a purified gelatin containing metallic impurities at a very low level. Other objects will be apparent to those skilled in the art on examination of the following description.

The process which is referred to herein as "fining," is defined generally as one in which a solution of gelatin, for example, is improved by the precipitation therein of a flocculent mass. As the flocculent mass precipitates through the solution, it removes impurities, improves color characteristics and reduces opacity. This improvement and clarification may be accomplished by any one or a combination of several phenomena, such as occlusion, coprecipitation, adsorption, etc., all of which will be included herein in the general category of fining.

In accordance with certain of its aspects, the process of this invention for fining a gelatin solution containing as an impurity a minor amount of a heavy metal includes the steps of adding to the solution at slightly alkaline pH a soluble phosphate salt, precipitating from said solution an insoluble salt of said phosphate containing said heavy metal thereby clarifying said gelatin solution, and separating said precipitate from the so-clarified gelatin solution.

The gelatin solution which may be treated in accordance with this invention may be a gelatin solution recovered from any one of the several steps in the recovery system commonly employed for producing gelatin. Commonly, it may, for example, be a gelatin solution which has been concentrated in an evaporator to a concentration of, for example, 2% to 10%, say 4 to 5% gelatin. The gelatin solution may have been formed from dry gelatin, either as produced or purchased, by adding gelatin to water to form a solution containing 2% to 10%, say 4 to 5% of gelatin.

The gelatin may have been prepared by either the so-called acid process or by the liming process. In either case, it will contain varying amounts of impurities including heavy metals. The term heavy metals as it is used in this application may include, typically, the following metals: calcium, barium, strontium, magnesium, beryllium, radium, lithium, iron, silver, lead, tin, chromium, mercury, copper, zinc, cadmium, titanium, uranium, gold, platinum, bismuth, etc. Other metals may also be present, but commonly they are not present in any appreciable quantities. The most common of these metals which may be present is calcium, and reference will often be made to calcium hereinafter.

It will be apparent to those skilled in the art that not all gelatins will contain all impurities including these heavy metals, and that the gelatins prepared by different processes will contain greater or lesser proportions of some of these metals. For example, a gelatin which has been prepared by the so-called acid process, e.g., one which has been recovered from pigskins, will generally contain substantially less calcium than would a gelatin which has been recovered from lime splits or ossein.

Practice of this invention is initiated by adding a soluble phosphate salt to a gelatin solution. Typical of the soluble phosphate salts are the mono-, di-, and tri-alkali metal phosphates; the mono-, di-, and tri-ammonium phosphates; orthophosphates; pyrophosphates, etc. Illustrative of the specific soluble phosphates which may be employed are the following: monosodium phosphate, disodium phosphate, trisodium phosphate, monoammonium phosphate, diammonium phosphate, triammonium phosphate, sodium hexametaphosphate, orthophosphoric acid, metaphosphoric acid, pyrophosphoric acid, guanylurea phosphate, tetrasodium pyrophosphate, sodium metaphosphate, etc.

In one preferred embodiment of this invention, the phosphate employed is a mixture of 50% monosodium phosphate and 50% disodium phosphate. In accordance with another preferred example of this invention, the phosphate may be orthophosphoric acid.

The amount of soluble phosphate which is employed will be at least sufficient to remove the heavy metals present by coprecipitation. Preferably the amount of soluble phosphate employed per 100 parts of dry gelatin (containing 12% by weight of moisture) is from 2.0 to 3.0, say 2.5 parts of monosodium phosphate. Molecularly equivalent amounts of other phosphates may be employed. The preferred amount of the preferred mixture of monosodium phosphate and disodium phosphate may be from 2.0 to 3.0, say 2.5 parts of mixture to 100 parts of gelatin.

The soluble phosphate may be added to the gelatin in the form of a solution, where the soluble phosphate is obtained as a dry soluble salt; where the soluble phosphate is employed in the form of a liquid, e.g., orthophosphoric acid, the acid may be diluted to appropriate concentration.

The pH of the gelatin solution before treatment may vary depending on the particular type of gelatin which is contained therein and the particular pretreatment which it may receive; commonly, a type A gelatin, i.e., one derived by an acid extraction process, will have a pH of 5.5 to 7, typically 6; a type B gelatin, i.e., one derived by a basic extraction process, will commonly have a pH of 6.5 to 7.5, typically 7.0. Where the pH of the gelatin solution is 7.0 to 9.5 and the soluble phosphate which is added thereto is not sufficient to change this pH appreciably, no further adjustment of pH is required. However, where the pH of the gelatin is substantially below this range of 7.0 to 9.5 and/or the soluble phosphate is added in such amounts as to either lower the pH substantially below about 7.0 or raise it substantially above about 9.5, the pH must be adjusted. Preferably this may be done by adding to the mixture of gelatin solution and soluble phosphate appropriate amounts of acid or base. When the pH of the mixture is below about 7.0, as may commonly be the case, it will be adjusted by addition of desired amounts of base, typically ammonium hydroxide. Where the pH of the mixture is above about 9.5, it may be altered by addition of appropriate amounts of acid, typically orthophosphoric acid. In a preferred embodiment final pH of the solution is approximately 8.0.

In one preferred embodiment the soluble phosphate which is added to the gelatin solution is orthophosphoric acid, and preferably this addition will be effected simultaneously with appropriate amounts of ammonium chloride and magnesium chloride; preferably the molecular ratio of these three components will be controlled so that it will be as follows: 1.3 parts by weight of $H_3PO_4$ to 1 part by weight of $NH_4Cl$ to 3.15 parts by weight of $MgCl_2 \cdot 6H_2O$, but the ratio may vary somewhat from this preferred ratio. When the invention is carried out in accordance with this embodiment, it is preferred to adjust the pH to about 9, preferably 9.15, this being effected by addition of ammonium hydroxide. Under these conditions there may be formed a precipitate of magnesium ammonium phosphate—$MgNH_4PO_4$.

The temperature at which the fining process is carried out is preferably in a range of 110° to 140° F., most preferably 130° F. The time of the process is dependent to an extent on the temperature maintained, but ordinarily 15 to 30 minutes is all that is required.

During the practice of this invention, typically as indicated in the embodiments hereinbefore set forth, there is formed in the solution a precipitate of an insoluble salt of the phosphate. In the case of the embodiment last mentioned, the insoluble salt may be magnesium ammonium phosphate. This insoluble salt carries down with it a substantial portion of the heavy metal content of the gelatin solution. It appears that this may be effected by proprecipitation, adsorption, occlusion, or by some other technique.

It may be that the precipitate includes an insoluble phosphate of one or more of the metals contained within the original gelatin. This precipitate also removes metallic impurities within the solution by coprecipitation, adsorption, occlusion, or by some other mechanism. It is not certain what is the mechanism by which these precipitates remove the various metals from solution.

Removal of these metals may be carried out in varying degrees depending upon the conditions of operation. In one series of more-or-less typical runs, it was found that in successive samples of gelatin, the calcium content was reduced from 4% down to 0.1%. In another series of examples, it was found that chromium content of the gelatin solution was reduced from typically as high as 500 parts per million down to the lower limit of measurability of about 0 to 1 part per million.

Preferably the precipitate may be separated from the fined solution of gelatin by decantation or filtration, or both. If desired, the fined gelatin may be passed along to further processing steps, including a drying operation.

It is preferred in the practice of this invention that the precipitation or flocculation be effected in the presence of a small amount of nucleation aid. Typically this necleation aid may be a finely divided filter aid such as aluminum silicate, typically as sold under the trademark "Johns-Manville Hyflo," or other desired filter aid. Those filter aids which can be employed in practice of this invention will contain very small quantities of heavy metals. Typically, this may be insured by a preliminary washing of the filter aid with water, acid, or other liquid which is free of metallic impurities and which may wash out from the filter aid any metallic impurities present. Preferred filter aids which may be employed subject to these prerequisites include activated charcoal, silica, and wood pulp.

Because of its chemical structure and colloidal nature, gelatin has been found to be an excellent chelating agent. When in contact with any one of a wide number of materials, typically including the heavy metals herein noted, it is found that not only will a gelatin solution pick up metals by way of adsorption onto, or chemical reaction with, the relatin moleclude, but that the material so retained within the gelatin structure is retained therein quite strongly. Thus not only has it been difficult heretofore to remove these materials from gelatin, but the gelatin strongly acts to acquire and to retain these heavy metals within the gelatin system. It is this fact which has heretofore contributed to the high degree of difficulty in removing these materials from gelatin.

The gelatin product prepared in accordance with practice of this invention is unexpectedly characterized by its low content of impurities, its substantial freedom from metals, its low ash content, its low toxicity due to the absence of toxic impurities including metals such as copper, its high degree of clarity, and its freedom from haziness. Furthermore, these properties may be obtained without undesirable loss of gelatin or of the properties, including viscosity, of the fined gelatin.

It is a particular feature of the technique and product of this invention that the product, even when prepared from gelatin containing chromium in amounts of 300 p.p.m. or more, may be substantially free of chromium, i.e., the product gelatin may contain chromium in amount as low as less than 1 p.p.m.

Practice of this invention will be more readily understood by reference to the following specific examples:

Example I

This example illustrates the treatment of gelatin to remove heavy metals therefrom by the use of magnesium ammonium phosphate. 17 parts by weight of impure gelatin was dissolved in 500 parts by weight of water and found to have very poor clarity. Analysis of the metal content of this gelatin indicated that it contained approximately 110 p.p.m. calcium, 50 p.p.m. iron, and 310 p.p.m. chromium. The gelatin had a total ash content of 2.3%, which is generally considered to be high.

1.12 parts of 85% orthophosphoric acid (having a pH of 4.2) was added to the gelatin solution with agitation together with 0.86 part of anhydrous ammonium chloride and 2.7 parts of magnesium chloride

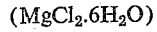

$(MgCl_2 \cdot 6H_2O)$

Ammonium hydroxide was then added raising the pH to 9.15. The solution became turbid because of the formation of insoluble magnesium ammonium phosphate. This precipitate was allowed to settle at a temperature of 120° F. for one-half hour and was then filtered through a metal-free filter to remove the precipitated magnesium ammonium phosphate. The filtered solution was evaporated to a 6% concentration and readjusted from pH 8.9 by addition of ammonia to raise the pH to 9.2. The effluent from the filter was substantially colorless and had a very high degree of clarity.

The solution was ion exchanged by passing it through a monobed of ion exchange resins IR–120 and Duolite A–30. IR–120 is a cationic resin of the nuclear sulfonic type, and Duolite A–30 is an anionic resin of the weak base type. The effluent from this ion exchange was crystal clear and had a pH of 8.9. The solution was dried and the dry gelatin analyzed for chromium. The analysis showed a chromium content of about 2.5 p.p.m., an iron content of about 3.8 p.p.m. and a calcium content of about 9 p.p.m. The total ash was less than 2.0%.

Example II

In accordance with this example, the charge solution may be 1,000 parts by weight of a 10% gelatin solution. The gelatin had an ash content of 3.9% and a chromium content of 132 parts per million. To this solution was added with agitation 25 parts by weight of a 10% solution containing equimolar parts of monosodium phosphate and disodium phosphate. Ammonium hydroxide was added to adjust the pH to 8.0. Metal-free filter aid was added and the solution digested for one-half hour at 55° C. At the end of this period a large, flocculent precipitate formed and was allowed to settle. The gelatin solution, after separation from this precipitate, was found to have a high degree of clarity, and to have no haziness. The ash content of the treated gelatin was 2.9%. The chromium content 3.2 p.p.m.

It will be apparent to those skilled in the art that various changes and modifications may be made to this invention, and that the specific embodiments herein disclosed and described are by way of illustration only.

We claim:

1. The method of fining a gelatin solution containing a minor amount of chromium as an impurity, which comprises adding to said solution a soluble phosphate selected from the group consisting of alkali metal and ammonium phosphates, orthophosphates, pyrophosphates, orthophosphoric acid and mixtures thereof, adding ammonium hydroxide to said solution to adjust the pH thereof to a range of about 7.0 to 9.5, maintaining the resulting solution at said pH until a precipitate of said phosphate forms which carries down said chromium impurity, and separating the precipitate from the fined gelatin solution.

2. The method of fining a gelatin solution containing a minor amount of chromium as an impurity, which comprises adding magnesium ion, ammonium hydroxide and a soluble phosphate selected from the group consisting of alkali metal and ammonium phosphates, orthophosphates, pyrophosphates, orthophosphoric acid and mixtures thereof, to said solution at a pH of about 7.0 to 9.5 to precipitate magnesium ammonium phosphate from said solution and carry down said chromium impurity, and separating the precipitate from the fined gelatin solution.

3. The method of fining a gelatin solution containing a minor amount of chromium as an impurity, which comprises adding to said solution magnesium ion, ammonium ion and orthophosphate ion, maintaining a pH of about 7.0 and 9.5 in said solution to precipitate insoluble magnesium ammonium phosphate, and separating said magnesium ammonium phosphate from the fined gelatin solution.

4. The method claimed in claim 3, in which the pH of said solution is maintained at about 9.15.

5. The method of fining a gelatin solution containing a minor amount of chromium as an impurity, which comprises adding to said solution about 2 to 3 parts per 100 parts of gelatin of a phosphate selected from the group consisting of alkali metal and ammonium phosphates, orthophosphates, pyrophosphates, orthophosphoric acid and mixtures thereof, adding ammonium hydroxide to said solution to adjust the pH thereof to a range of about 7.0 to 9.5, maintaining said pH and a temperature of about 110° to 140° F. in said solution until a precipitate of said phosphate forms which carries down said chromium impurity, and separating the precipitate from the fined gelatin solution.

References Cited in the file of this patent

UNITED STATES PATENTS 2,166,297    Jacquet _____ July 18, 1939

FOREIGN PATENTS 709,331    Germany _____ July 3, 1941

OTHER REFERENCES

Lollar: "Leather Chemists Association" (1940), volume 35, pages 595–605.

Thorne et al.: "Inorganic Chemistry" (1943), pages 723–725.